Sept. 28, 1937.   O. W. YOUNG   2,094,251
BEARING AND BEARING MOUNTING
Filed Feb. 14, 1935
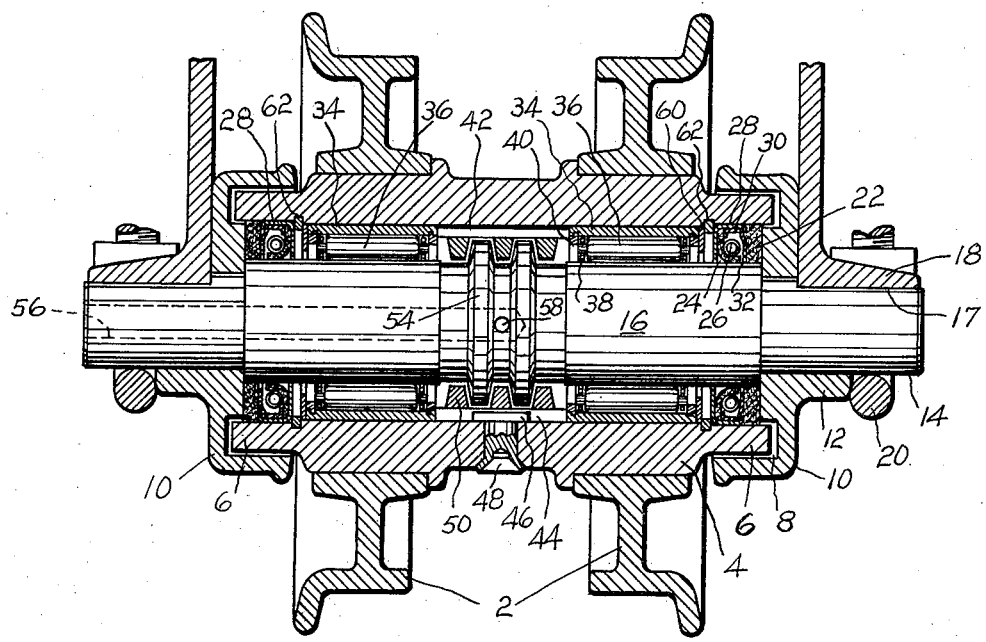
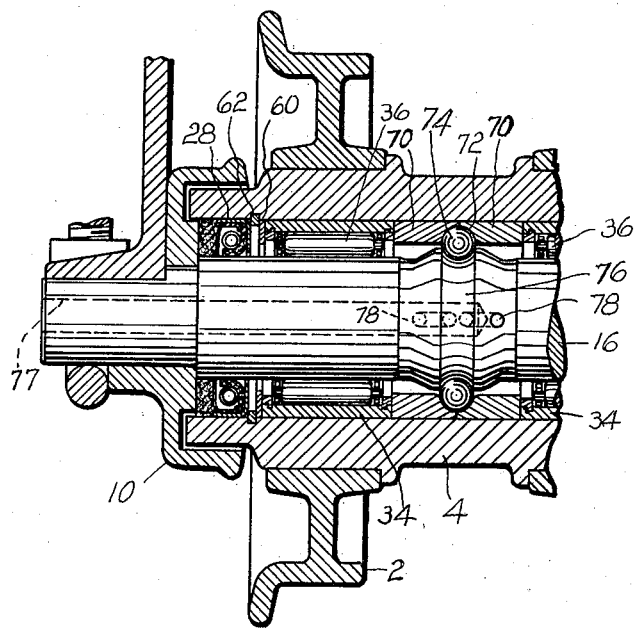
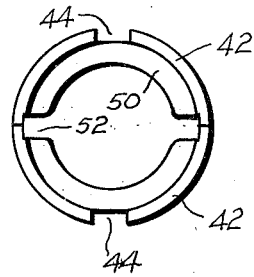
INVENTOR:
OTTO W. YOUNG,
BY Gales F. Moore
HIS ATTORNEY.

Patented Sept. 28, 1937

2,094,251

UNITED STATES PATENT OFFICE 2,094,251

BEARING AND BEARING MOUNTING

Otto W. Young, East Orange, N. J., assignor to General Motors Corporation, Detroit, Mich., a corporation of Delaware Application February 14, 1935, Serial No. 6,535

9 Claims. (Cl. 308—168)

This invention relates to bearings and bearing mountings and comprises all of the features of novelty herein disclosed. An object of the invention is to provide an improved radial and thrust bearing combination and mounting. Another object is to provide an improved thrust bearing.

To these ends and also to improve generally upon devices of this character, the invention consists in the various matters hereinafter described and claimed. In its broader aspects, the invention is not necessarily limited to the specific constructions selected for illustrative purposes in the accompanying drawing in which Fig. 1 is a vertical cross sectional view of the improved bearing mounting.

Fig. 2 is an end view of a thrust sleeve.

Fig. 3 is a view similar to Fig. 1 showing a modification.

The device is shown applied to track laying apparatus comprising a pair of flanged wheels or rolls 2 which are pressed on a housing or hub structure 4 against flanges thereof. The housing or hub structure is extended at each end as at 6 into an annular recess 8 of a dust guard 10 which has its hub portion 12 mounted on the reduced end 14 of a shaft 16. The shaft has each end portion flattened as at 17 to fit a frame member 18 to which it is secured by a clip 20. To exclude dirt and retain lubricant, a felt washer 22 surrounds the shaft outside of a unitary sealing device comprising a leather washer 24 and a coil spring 26, both enclosed in an angular casing 28 carried by the hub. The washer 24 is held by an angle washer 30 abutting against a dished side washer 32 which is retained by a little flange on the casing 28. The foregoing is not per se a part of the present invention.

Two outer race rings or sleeves 34 are inserted in the housing or hub structure 4 in the plane of the wheels 2. Antifriction rolling elements, herein shown as cylindrical rollers 36 to take radial load, run in the raceway sleeves, the rollers having reduced ends or trunnions which enter holes in cage rings 38. The caged rollers are held against material endwise motion by split retaining washers 40 which have narrow flanges entering grooves in each race sleeve 34. The race sleeves 34 are spaced apart by a sleeve (Fig. 2) formed in two semi-cylindrical sections 42. Each sleeve section has a longitudinal slot 44 interrupting its periphery and into one of these slots projects a keying head 46 on a rivet 48 which passes radially through the housing or hub structure and is upset at the outside. The key holds the sleeve sections from rotation in the housing.

Each sleeve section 42 has a plurality of pairs of internal arcuate thrust ribs 50, these ribs terminating short of a half circle to leave spaces 52 opposite to the abutting ends of the sleeve sections to form longitudinal passages for lubricant which can pass freely through the assembled sleeve sections. One of the slots 44 also forms a lubricant passage at 90° from the spaces 52, and both slots 44 are open outwardly and extend across the ribs 50 which thus connect the interrupted portions of the sleeve sections.

The ribs 50 mate with peripheral thrust collars or ribs 54 extending around the shaft 16. The mating ribs alternate or overlap so that a pair of ribs on one member straddle a rib on the other. The thrust ribs take the thrust occasioned by any slight axial shifting of the wheels 2 while the roller bearings take the radial load. In order to lubricate the thrust surfaces, a lubricant passage 56 extends from one end of the shaft to a diametrical port 58 which breaks through to the periphery of the shaft between the ribs 54. Lubricant can pass over the continuous ribs 54 and through the slots 52 and 44 to the roller bearings. Washers or shims 60 of selected thickness are placed between the outer ends of the race sleeves 34 and split retaining washers 62 which enter grooves in the hub thus holding the bearings from shifting in the hub. Except as to the passage 56, the mounting is or may be entirely symmetrical about a vertical axis.

In Fig. 3, the outer race sleeves 34 are spaced apart by a sectional thrust sleeve comprising a pair of abutting race rings 70, the race rings having mating grooves 72 forming a thrust raceway for a row of thrust balls 74. The balls run in an inner raceway 76 formed by a peripheral groove in an enlargement of the shaft. The ball bearing takes the endwise thrust forces and limits the axial shifting of the hub. One end of the shaft has a lubricant passage 77 communicating with two inclined ports 78 which break through the shaft at opposite sides of the raceway 76. Lubricant thus has access to the thrust bearing and both of the roller bearings.

I claim:

1. In a device of the character described, a shaft, a housing, a pair of radial load bearings between the shaft and the housing, a sleeve engaging and spacing said bearings apart, the sleeve and the shaft having mating thrust ribs overlapping one another, a rib on one member entring between a pair of ribs on the other member, and the sleeve having a longitudinal slot extending crosswise of the ribs to form a passageway between the radial bearings; substantially as described.

2. In a device of the character described, a shaft, a housing, a pair of radial load bearings between the shaft and the housing, a sleeve engaging and spacing said bearings apart, the sleeve and the shaft having mating thrust ribs overlapping one another, a rib on one member entering between a pair of ribs on the other member, the sleeve having longitudinal slots extending through it across the outside of the ribs, and a key entering one of the slots, the other slot forming a lubricant passage between the radial bearings; substantially as described.

3. In a device of the character described, a shaft, a housing, a pair of radial load bearings between the shaft and the housing, a sleeve engaging and spacing said bearings apart, the sleeve and the shaft having mating thrust ribs overlapping one another, a rib on one member entering between a pair of ribs on the other member, the sleeve having a longitudinal slot extending crosswise of its ribs and from the periphery of the sleeve to the ribs, and the ribs being interrupted at a point removed from said longitudinal slot to form a lubricant passage between the radial bearings; substantially as described.

4. In a device of the character described, a shaft, a housing, a pair of radial load bearings between the shaft and the housing, a sleeve engaging and spacing said bearings apart, the sleeve and the shaft having mating thrust ribs overlapping one another, a rib on one member entering between a pair of ribs on the other member, the sleeve having longitudinal slots crossing the ribs and extending from the periphery of the sleeves to the ribs, the ribs being interrupted at a point removed from the slots to form lubricant passages, and a key entering one of the slots in the sleeve; substantially as described.

5. In a device of the character described, a shaft, a housing, a pair of radial load bearings between the shaft and the housing, a sleeve engaging and spacing said bearings apart, the sleeve and the shaft having mating thrust ribs overlapping one another, a rib on one member entering between a pair of ribs on the other member, and the member having the pair of ribs having a lubricant passage extending through it from the periphery to the space between the ribs; substantially as described.

6. In a device of the character described, a shaft, a housing, a pair of radial load bearings between the shaft and the housing, a sleeve between the bearings and engaging the ends of the bearings to space them apart, the sleeve being formed in sections with arcuate internal ribs on each section, the ends of the ribs on each section being separated and the sleeve being slotted across the ribs from the ribs to the outer periphery at the sleeve, and the shaft having peripheral ribs mating with the arcuate ribs; substantially as described.

7. In a device of the character described, a shaft, a housing, a sleeve between the shaft and the housing, the sleeve and the shaft having mating thrust ribs overlapping one another, the sleeve having a longitudinal slot open outwardly and interrupting its periphery outside of its thrust ribs, and the thrust ribs extending across the slot and connecting the interrupted portions of the sleeve; substantially as described.

8. In a device of the character described, a shaft, a housing, a sleeve between the shaft and the housing, the sleeve and the shaft having mating thrust ribs overlapping one another, the sleeve having a longitudinal slot open outwardly and interrupting its peripheral continuity outside of its thrust ribs, the thrust ribs extending across the slot and connecting the interrupted portions of the sleeve, and the ribs being interrupted by a longitudinal slot at a location angularly removed from the slotted interruption in the sleeve periphery; substantially as described.

9. In a device of the character described, a shaft, a housing, a sleeve between the shaft and the housing, the sleeve being formed in abutting arcuate sections with arcuate internal ribs on each section, the shaft having thrust ribs mating with the internal ribs, the ends of the ribs on each section terminating short of the ends of the section to form longitudinal slots opposite to the abutting ends of the sections, and the sleeve sections being slotted longitudinally with the ribs extending across the slots; substantially as described.

OTTO W. YOUNG.